United States Patent [19]
Hartman

[11] Patent Number: 6,157,099
[45] Date of Patent: Dec. 5, 2000

[54] SPECIALLY ORIENTED MATERIAL AND MAGNETIZATION OF PERMANENT MAGNETS

[75] Inventor: Albert Hartman, Palo Alto, Calif.

[73] Assignee: Quantum Corporation, Milpitas, Calif.

[21] Appl. No.: 09/231,712

[22] Filed: Jan. 15, 1999

[51] Int. Cl.$^7$ .................................................. H02K 41/00
[52] U.S. Cl. .............................................. 310/13; 310/12
[58] Field of Search .................................. 310/12, 42, 43, 310/44; 335/302; 360/78.13, 78.12

[56] References Cited

U.S. PATENT DOCUMENTS

| | | |
|---|---|---|
| 4,185,262 | 1/1980 | Watanabe et al. . |
| 4,547,758 | 10/1985 | Shimizu et al. . |
| 4,600,555 | 7/1986 | Shimizu . |
| 4,628,809 | 12/1986 | Das et al. . |
| 4,678,634 | 7/1987 | Tawara et al. . |
| 4,818,305 | 4/1989 | Steingroever . |
| 4,888,512 | 12/1989 | Shimizu . |

OTHER PUBLICATIONS

Hitachi Rare–Earth Magnet Brochure, Hitachi Metal, Ltd., Front cover, p. 42 and Rear cover, date of publication unknown.

*Primary Examiner*—Nestor Ramirez
*Assistant Examiner*—Judson H. Jones
*Attorney, Agent, or Firm*—Steven G. Roeder

[57] ABSTRACT

A permanent magnet for an actuator motor of a disk drive is provided herein. The permanent magnet includes an arch shaped magnet body which is made of a magnet powder. The magnet body including a first segment and a second segment which are substantially side by side. Each segment has a north pole and a spaced apart south pole. Each segment includes a first region having a first region axis which extends between the north pole and the south pole and a second region which encircles the first region. Importantly, the magnet powder is aligned during manufacturing to form a powder pattern having first region powder lines in the first region which are substantially parallel with the first region axis and second region powder lines in the second region which are angled relative to the first region axis. Further, the magnet body includes a magnetization pattern having first region magnetization lines in the first region which are substantially parallel with the first region axis and second region magnetization lines in the second region which are angled relative to the first region axis.

19 Claims, 7 Drawing Sheets

SPECIALLY ORIENTED MATERIAL AND MAGNETIZATION OF PERMANENT MAGNETS

FIELD OF THE INVENTION

The present invention relates to actuator motors. More specifically, the present invention relates to permanent magnets for voice coil actuator motors and a method for making permanent magnets for voice coil actuator motors.

BACKGROUND

Disk drives are widely used in computers and data processing systems for storing information in digital form. Disk drives typically utilize one or more rotating, storage disks and a plurality of data transducers to interact with each storage disk. An E-block having a plurality of spaced apart actuator arms retains the data transducers proximate each storage disk. An actuator motor moves the E-block and the data transducers relative to the storage disks.

The need to rapidly access information has led to disk drives having storage disks which are rotated at ever increasing speeds and an actuator motor which moves the E-block at ever increasing rates. Unfortunately, this typically results in increased heat, noise and power consumption of the disk drive.

FIG. 1 illustrates a rear perspective view of a portion of a prior art, rotary, voice coil actuator motor 100. In this embodiment, a flat, trapezoidal shaped coil 102 is positioned between two permanent magnets 104 and two flux return plates 106. The coil 102 is secured to the E-block (not shown). Current passing through the coil 102 causes the coil 102 to move relative to the permanent magnets 104 to move the E-block.

One factor which effects efficiency of the actuator motor 100 is the strength of the magnets 104. In the prior art actuator motor 100 illustrated in FIG. 1, the magnets 104 include magnetization lines 108 (illustrated as arrows) which are oriented substantially perpendicular to the coil 102. Unfortunately, with this design, the strength of these magnets 104 vary approximately 14–20 percent across the stroke of the coil 102. More specifically, the strength of the magnets 104 is high, near the center and drops near the sides of the magnets 104. This non-linearity causes difficulty in precisely moving the coil 102. Inaccurate positioning of the coil 102 leads to data transfer errors between the data transducers and the storage disks.

One attempt to solve this problem involves flattening the magnet strength at the center of the magnets 104 so that the strength of the magnets 104 is approximately linear. This can be done by reducing the flux in the flux return plates 106 by thickening the flux return plates 106 and thinning the magnets 104 near the center. Unfortunately, this reduces the average strength of the magnets 104 and increases data retrieval times of the disk drive.

In light of the above, it is an object of the present invention to provide a efficient magnet for devices such as actuator motors for disk drives. It is another object to provide a permanent magnet for a disk drive which is relatively easy to manufacture. Yet another object is to provide a permanent magnet which significantly improves the performance of the actuator motor and provides substantially linear movement of the actuator motor.

SUMMARY

A permanent magnet which satisfies these needs is provided herein. The permanent magnet is particularly useful with an actuator motor for a disk drive. The permanent magnetic includes a magnet body which is made of a magnet powder. The magnet body includes a first segment and a second segment. Each segment is divided into a first region and a second region. The first region has a first region axis. Importantly, the magnet powder is aligned during manufacturing to form a powder pattern having second region powder lines in the second region which are angled relative to the first region axis. Preferably, the powder pattern also includes first region powder lines in the first region which are substantially parallel with the first region axis.

This unique powder pattern facilitates a unique magnetization pattern in the magnet body. The unique magnetization pattern results in higher magnetic flux densities at the sides, higher average magnetic flux densities and more linear magnetic flux densities in the magnet. The higher magnetic flux densities create higher seek forces and the linear flux densities result in accurate movements of the actuator motor. Additionally, the higher magnetic flux densities at the sides of the magnet body, i.e. a greater radius, results in higher torques on a coil of the actuator motor. This enables the magnet to generate more force from a given amount of current in the coil and increases the efficiency of the actuator motor. This also reduces the amount of power consumed by the motor, reduces the amount of heat and noise generated by the motor during operation and increases operational time of the motor for a given battery charge. Further, the size of the magnet can be reduced for a given force requirement. These considerations are particularly important for computer disk drives, which often operate in heat and noise sensitive environments, or on battery power.

The magnet body is typically arch shaped and includes a transition zone which vertically divides the magnet body into the first segment and the second segment which are substantially side by side. Each segment has a north pole and a spaced apart south pole. The north pole and south pole for the two segments are inverted.

As provided above, the magnet body includes a unique magnetization pattern. More specifically, each segment includes a magnetization pattern having first region magnetization lines in the first region which are substantially parallel with the first region axis and second region magnetization lines in the second region which are angled relative to the first region axis. Thus the alignment of the magnet powder in the magnet body corresponds to the magnetization pattern.

Typically, the magnet is formed utilizing powder metallurgy processes with a mold having an appropriately shaped mold cavity which receives the magnetic powder. An orienting fixture creates a magnetic field having flux lines which pass through the mold cavity. The flux lines orient the magnet powder in the mold cavity to define the powder pattern outlined above.

The present invention is also a method for manufacturing a magnet. The method includes the steps of positioning a magnet powder in the mold cavity and aligning a portion of the magnet powder in the mold cavity with a magnetic field to form the powder pattern outlined above. The method can also include the step of magnetizing the magnet to include the magnetization pattern outlined above.

Importantly, the magnet is made utilizing a unique manufacturing process and the magnet includes a unique magnetization pattern which increases the amount of force generated for a given amount of current in the coil. Further, the magnet provides substantially linear movement of the coil. This increases the efficiency, accuracy and performance of the actuator motor, thereby reducing data seek times and amount of power consumed by the actuator motor.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
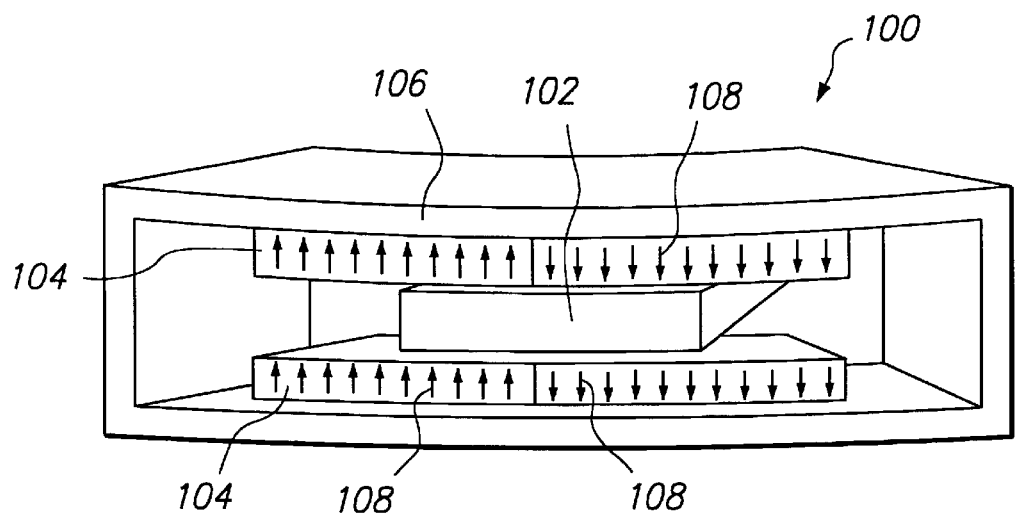
FIG. 1 is a perspective view of a portion of a prior art actuator motor.
Figure 2:
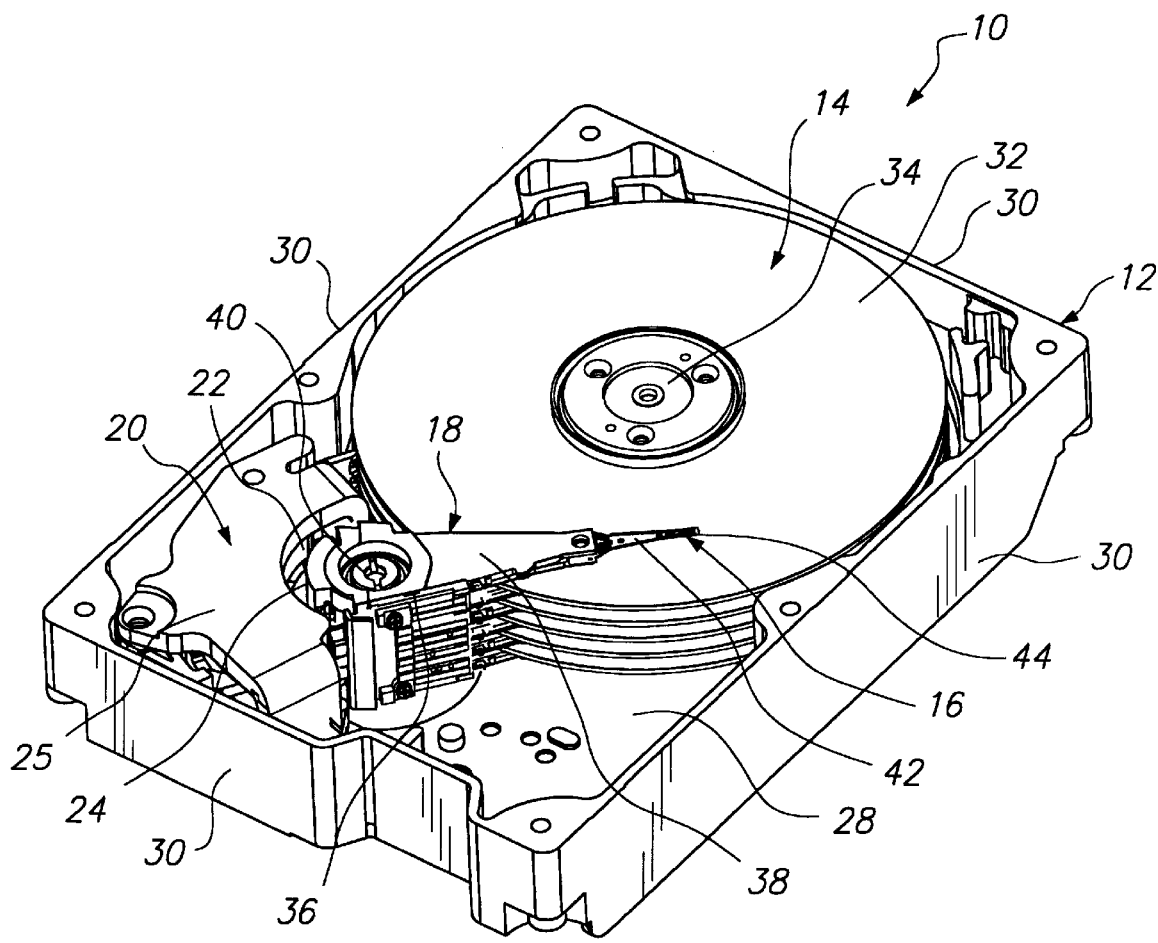
FIG. 2 is a perspective view of a disk drive having features of the resent invention.
Figure 3:
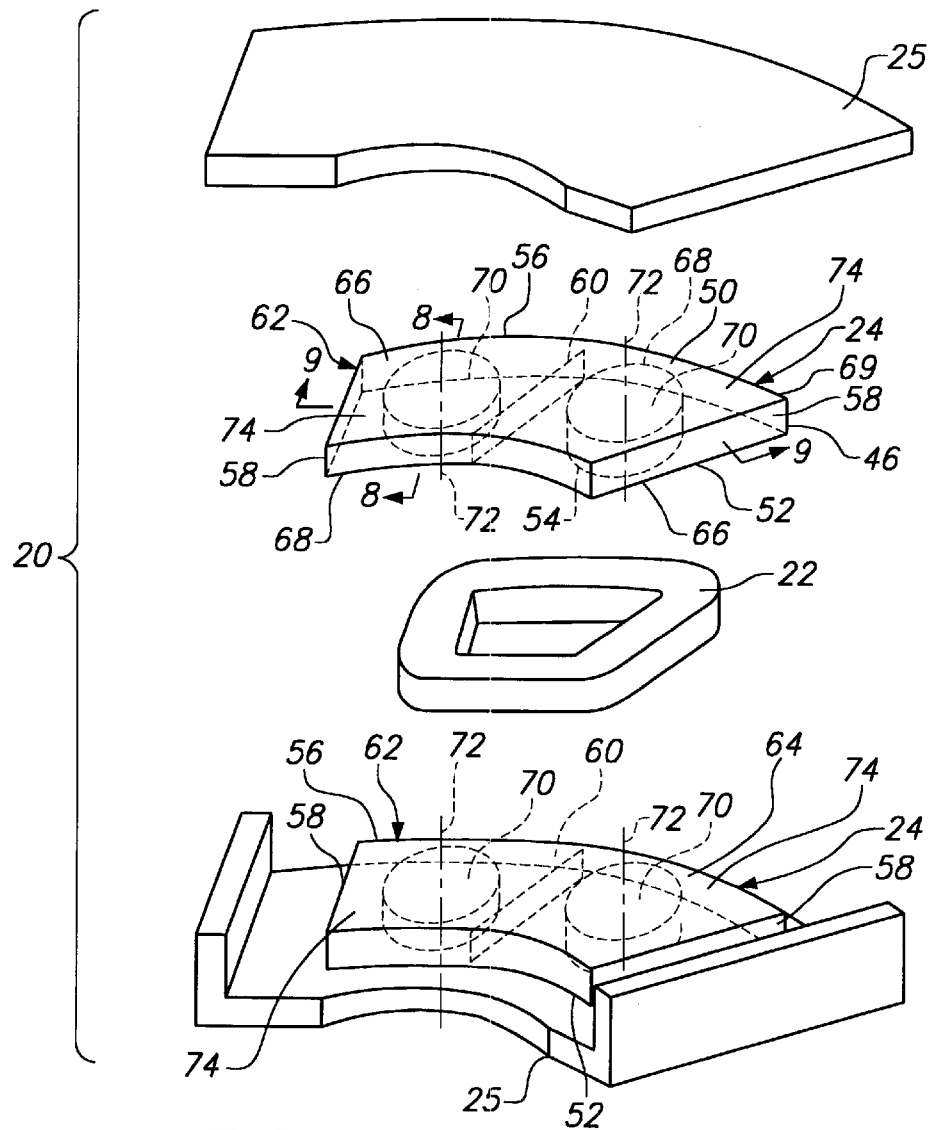
FIG. 3 is an exploded perspective view of a portion of an actuator motor having features of the present invention.

Referring initially to FIGS. 2 and 3, the present invention is directed to a disk drive 10 having a disk housing 12, a disk assembly 14, transducer assemblies 16, an E-block 18 and an actuator motor 20. The actuator motor 20 includes a coil 22, one or more permanent magnets 24, and one or more flux return plates 25. As provided in detail below, each magnet 24 is made utilizing a unique manufacturing process and each magnet 24 is magnetized to have a unique magnetization pattern 26 (illustrated in FIGS. 10–18). The unique magnetization pattern 26 increases the amount of force generated by each magnet 24 on the coil 22 of the actuator motor 20 from a given amount of current in the coil 22. This allows the actuator motor 20 to quickly move the E-block 18 and the transducer assemblies 16 to decrease the data recovery time. Further, the increased efficiency of the actuator motor 20 reduces energy consumption and increases operational time of the actuator motor 20 for a given battery charge for a portable unit. The magnet 24 provided herein is particularly useful for voice coil rotary actuator motors for a disk drive 10.

A detailed description of the various components of a disk drive 10 is provided in U.S. Pat. No. 5,208,712, issued to Hatch et al, and assigned to Quantum Corporation, the Assignee of the present invention. The contents of U.S. Pat. No. 5,208,712, are incorporated herein by reference. Accordingly, this discussion is limited to the aspects of the disk drive 10 which particularly relevant.

The drive housing 12 retains the various components of the disk drive 10. The drive housing 12 is formed with a cover (not shown), a base 28 and spaced apart side walls 30. The base 28 and side walls 30 are typically formed as an integral unit while the cover is attached to the side walls 30.

The disk assembly 14 includes one or more storage disks 32 mounted to a spindle hub 34. A spindle motor (not shown) rotates the spindle hub 34 and the storage disks 32 at a constant angular velocity. Each storage disk 32 stores data in a form that can be subsequently retrieved if necessary. Magnetic storage disks 32 are commonly used to store data in digital form. Depending upon the design of the disk drive 10, any number of storage disks 32 can be used with the disk drive 10. For example, the disk drive 10 can include one, five, six, nine or twelve storage disks.

The design of the E-block 18 depends upon the design of the disk drive 10. The E-block 18 includes a tubular actuator hub 36 and one or more actuator arms 38 which cantilever away from the actuator hub 36. The actuator hub 36 rotates on an actuator shaft 40 which is secured to the base 28. The actuator arms 38 rotate with the actuator hub 36 and position the transducer assemblies 16 between the disks 32. The number and spacing of the actuator arms 38 varies according to the number and spacing of the disks 32.

The transducer assembly 16 typically includes a load beam 42 used to attach each data transducer 44 to one of the actuator arms 38. Typically, one data transducer 44 interacts with a single storage surface on one of the storage disks 32 to access or transfer information to the storage disk 32. For a magnetic storage disk 32, the data transducer 44 is commonly referred to as a read/write head.

The actuator motor 20 precisely moves the E-block 18 and the transducer assembly 16 relative to the storage disks 32. In the embodiment shown in the Figures, the actuator motor 20 is a rotary voice coil actuator. In this embodiment, the flat, trapezoidal shaped coil 22 is attached to the actuator hub 36. The coil 22 is disposed between two permanent magnets 24 and flux return plates 25. The coil 22 is separated from the permanent magnets 24 by an air gap. The flux return plates 25 serve as a return path for magnetic fields from the magnet 24 and may be formed of soft iron or steel.

Current passing through the coil 22 causes the coil 22 to move relative to the magnets 24. This causes the actuator hub 36 and the actuator arms 38 to rotate.

In an embodiment, the actuator motor 20 could be a linear induction motor (not shown) which moves radially with respect to the disks 32. In still another embodiment, the actuator motor 20 could be a rotary motor which utilizes only one magnet.

FIG. 3, illustrates an exploded view of an actuator motor 20 which utilizes two magnets 24. More specifically, one of the magnets 24 in this embodiment is positioned above the coil 22 and one of the magnets 24 is positioned below the coil 22. Alternately, the actuator motor 20 could include a single magnet positioned either above or below the coil 22. Each magnet 24 is defined by a curved or substantially arched shaped magnet body 46 which is made of a magnet powder 48 (shown in FIGS. 4–9). The magnet body 46 is defined by a substantially flat top surface 50, a spaced apart, substantially flat bottom surface 52, an arc shaped inner side 54, an arc shaped outer side 56, and a pair of spaced apart radial sides 58. A transition one 60 vertically divides the magnet body 46 into a first segment 62 and a second segment 64 which are side-by-side. The transition zone 60 is represented by dashed lines. Each of the segments 62, 64, when magnetized, has a north pole 66 and a south pole 68. The poles 66, 68, of the first and second segments 62, 64, are inverted.

In the embodiment illustrated in the Figures, the magnet body 46 is a unitary structure. Alternately, the first and second segments 62, 64 can be distinct structures which are made independently and subsequently positioned side-by-side to form the magnet body 46.

Each segment 62, 64, includes a first region 70 (represented by dashed lines in FIGS. 3, 8, 9,17, and 18) having a first region axis 72 which extends between the north pole 66 and the south pole 68 and a second region 74 which encircles and surrounds the first region 70. The first region 70 illustrated in the Figures is shaped similar to a right circular cylinder and has a circular cross-section. The second region 74 is arched shaped and is defined by a portion of the top surface 50, a portion of the bottom surface 52, a portion of the inner side 54, a portion of the outer side 56, one of the radial sides 58 and the transition zone 60. Basically, second region 74 is defined by the perimeter of each segment 62, 64. The size and shape of the first region 70 and the second region 72 can be varied according to the design requirements of the magnet 24.

Importantly, the magnet body 46 is magnetized with the unique magnetization pattern 26 and is manufactured utilizing a unique process which enhances ability of the magnet body 46 to retain the magnetization pattern 26. The manufacturing process includes aligning and orienting the magnet powder 48 during manufacturing to form a unique powder pattern 75. A representative portion of the powder pattern 75 is illustrated in FIGS. 4–9 for the magnet 24 positioned below the coil 22. The magnet powder 48 is aligned into the unique powder pattern 75 to enhance ability of the magnet body 46 to retain the magnetization pattern 26. The alignment of the magnet powder 48 in the magnet body 46 is designed to correspond to the desired magnetization pattern 26.

Figure 4:
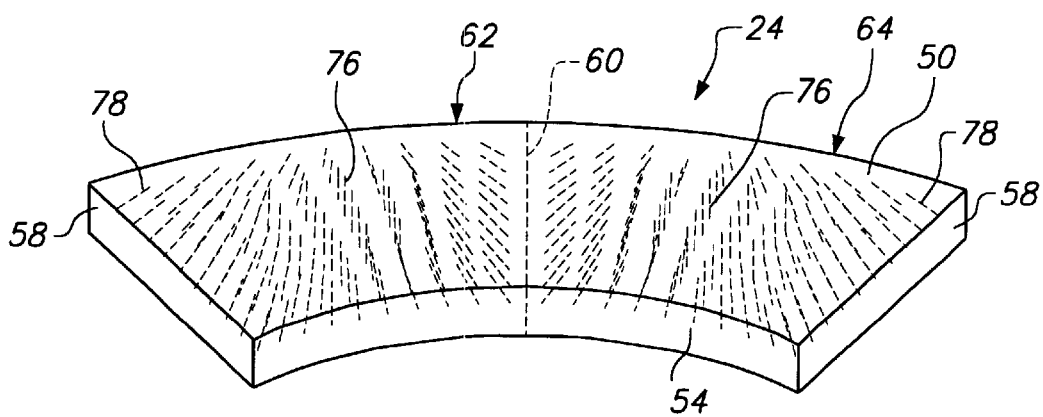
FIG. 4 is a top perspective view of a portion of a magnet having features of the present invention.
Figure 5:
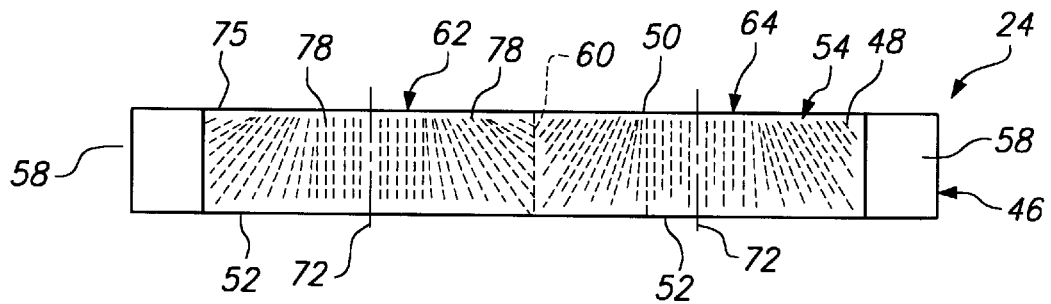
FIG. 5 is a front plan view of a bottom magnet illustrating a portion of a powder pattern on the inner side.
Figure 6:
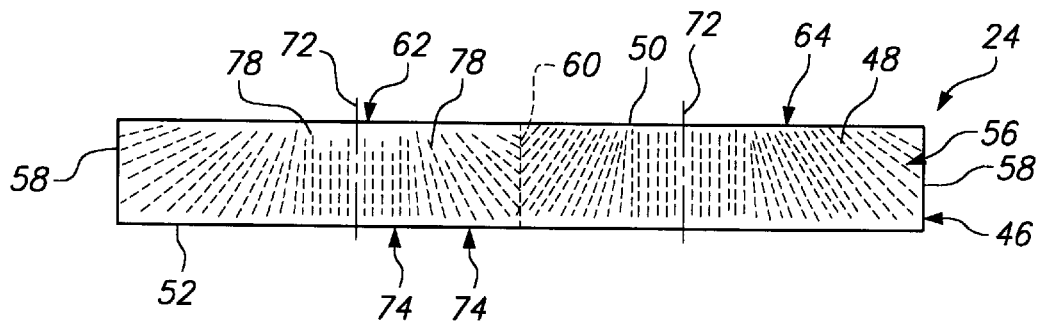
FIG. 6 is a rear plan view of the magnet of FIG. 5 illustrating a portion of the powder pattern on the outer side.
Figure 7:
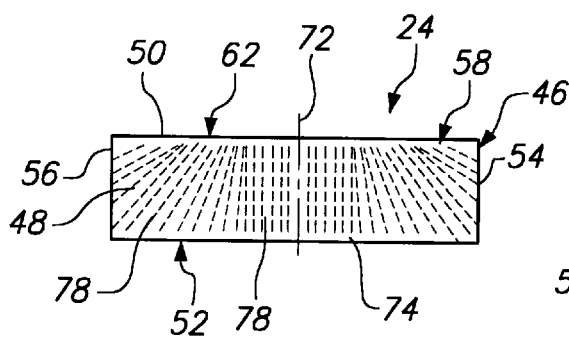
FIG. 7 is a side plan view of the magnet of FIG. 5 illustrating a portion of the powder pattern on a radial side.
Figure 8:
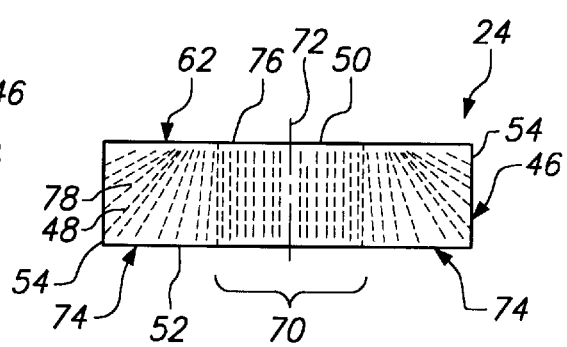
FIG. 8 is a view of the powder pattern of a bottom magnet as seen from Line 8—8 of FIG. 3.
Figure 9:
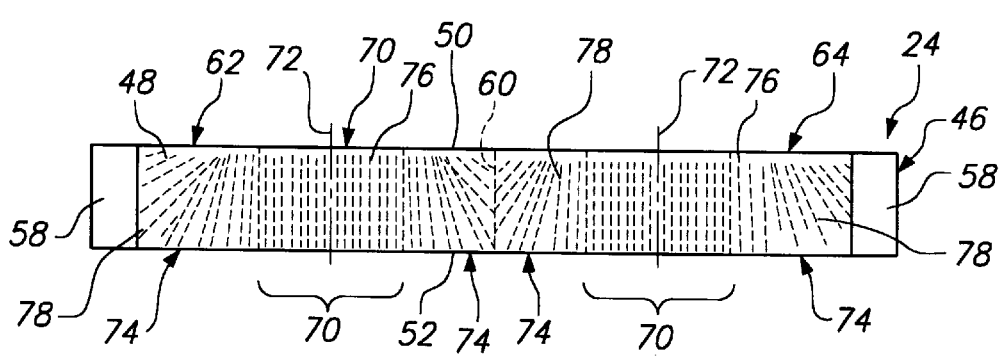
FIG. 9 is a view of the powder pattern of a bottom magnet as seen from Line 9—9 of FIG. 3.
Figure 10A:
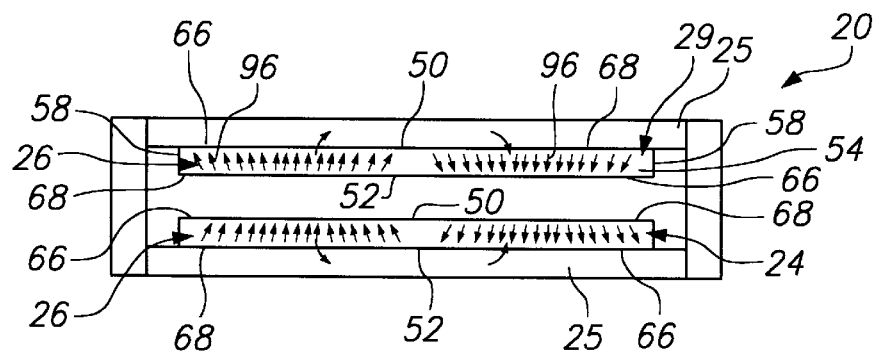
FIG. 10A is a front plan view of a first embodiment of a portion of an actuator motor, without coil, illustrating a portion of a magnetization pattern.
Figure 10B:
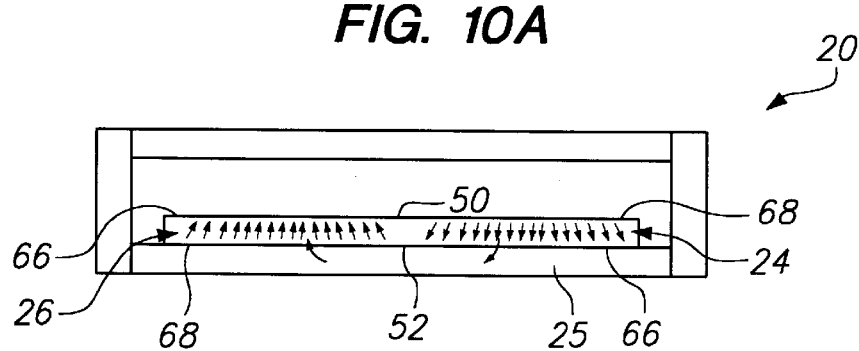
FIG. 10B is a front plan view of a second embodiment of a portion of an actuator motor, without coil, illustrating a portion of a magnetization pattern.

The term powder pattern 75 as used herein shall mean the pattern which is formed by the oriented and aligned magnet powder 48 in the magnet 24. The powder pattern 75 is only visible at a microscopic level. The magnet powder 48 is illustrated in FIGS. 4–9 to facilitate understanding of the present invention. More specifically, FIG. 4 illustrates the powder pattern 75 from a perspective view, FIG. 5 illustrates the powder pattern 75 when looking towards the inner side 54 of the magnet body 24, FIG. 6 illustrates the powder pattern 75 when looking towards the outer side 56, FIG. 7 illustrates the powder pattern 75 when looking a radial side 58, FIG. 8 illustrates the powder pattern 75 as seen from Line 8—8 of FIG. 3 and FIG. 9 illustrates the powder pattern 75 as seen from Line 9–9 of FIG. 3.

The powder pattern 75 for each segment 62, 64, includes first region powder lines 76 (illustrated in FIGS. 8 and 9) in the first region 70 and second region powder lines 78 in the second region 74. The first region powder lines 76 are substantially parallel with the first region axis 72 while the second region powder lines 78 are angled relative to the first region axis 72. Thus, the powder pattern 75 is defined by substantially vertical first region powder lines 76 in the first region 70 and angled second region powder lines 78 in the second region 74.

Referring to FIGS. 8–9, the first region powder lines 76 near the second region 74 are still substantially parallel to the first region axis 72. It should be recognized, however, that the first region powder lines 76 tend to angle slightly relative to the first region axis 72 as the radial distance from the first region axis 72 increases. Further, the angle of the second region powder lines 78 increases as the radial distance from the first region axis 72 increases. Stated another way, the second region powder lines 78 near the first region 70 are almost parallel with the first region axis 72 while the second region powder lines 78 near the sides 54, 56, 58, are more angled. In particular, the second region powder lines 78 near the sides 54, 56, 58 can be angled between approximately 20 and 70 degrees relative to the first region axis 72.

Preferably, the second region powder lines 78 throughout the entire second region 74 are angled relative to the first region axis 72. More specifically, the second region powder lines 78 for each second region 74 are angled relative to the first region axis 72 near the inner side 54, the outer side 56, the radial side 58 and the transition zone 60.

It should be noted that in the first segment 62, when moving from the bottom surface 52 to the top surface 50, the second region powder lines 78 are angled towards the first region axis 72. Alternately, in the second segment 64, when moving from the bottom surface 52 to the top surface 50, the second region powder lines 78 are angled away from the first region axis 72.

Figure 19:
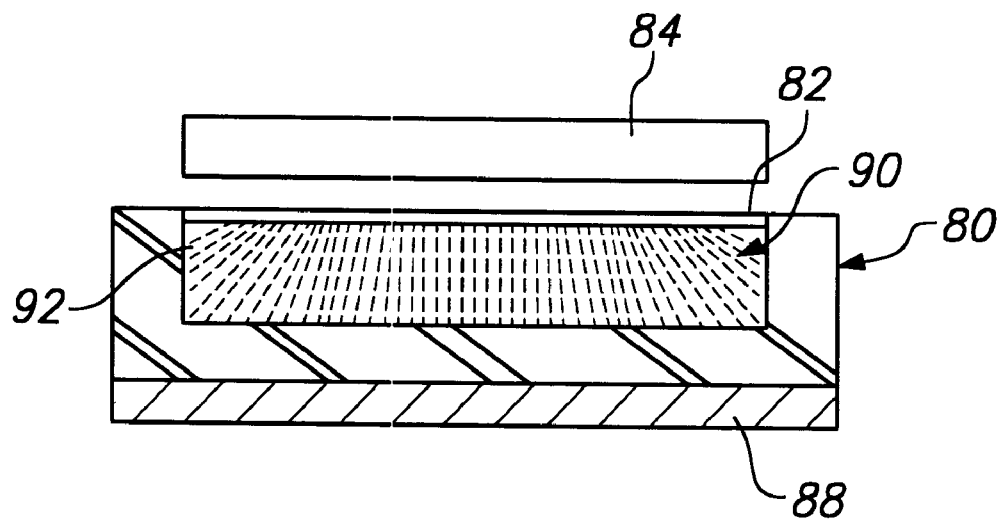
FIG. 19 is a side cut-away view of a mold having features of the present invention.

Referring to FIG. 19, the magnet powder 48 is preferably formed into the magnet body 46 in a mold 80 utilizing powder metallurgy processes. In this embodiment, the mold 80 includes an arched or curved shaped mold cavity 82. In a typical powder metallurgy process, the magnet powder (not shown in FIG. 19) is initially added to the mold cavity 82. Subsequently, the magnet powder 48 is compressed in the mold cavity 82 with a compression ring 84 to form a pressed magnet body 46 (not shown in FIG. 19). Next, the magnet body 46 is removed from the mold 80 and is heated.

An orienting fixture 88 can be used to create a magnetic field 90 having a plurality of flux lines 92 which pass through the mold cavity 82 to form the unique powder pattern 75 outlined above in the magnet body 46. An example of the magnetic field 90 is illustrated in FIG. 19. The flux lines 92 align and orient of the magnet powder 48 in the mold cavity 82 during the powder metallurgy process to form the powder pattern 75. Typically, the flux lines 92 are used to orient the magnet powder 48 prior to and during the compression of the magnet powder 48 in the mold cavity 82. The appropriate orienting fixture 88 can be designed using a number of techniques known to the industry.

Figure 11:
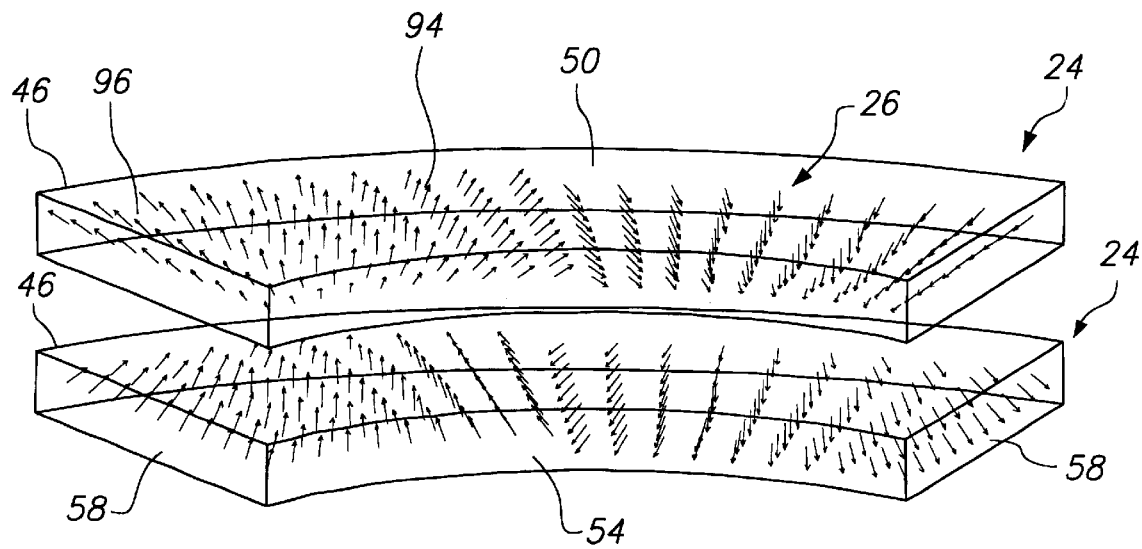
FIG. 11 is a top perspective view of a pair of magnets, illustrating a portion of the magnetization pattern.
Figure 12:
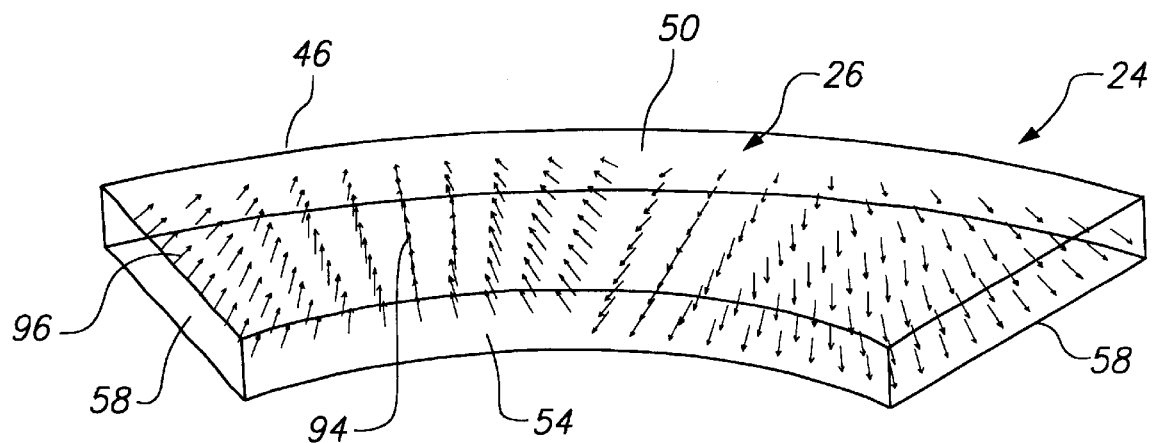
FIG. 12 is a top perspective view of a single magnet illustrating a portion of the magnetization pattern.
Figure 13:
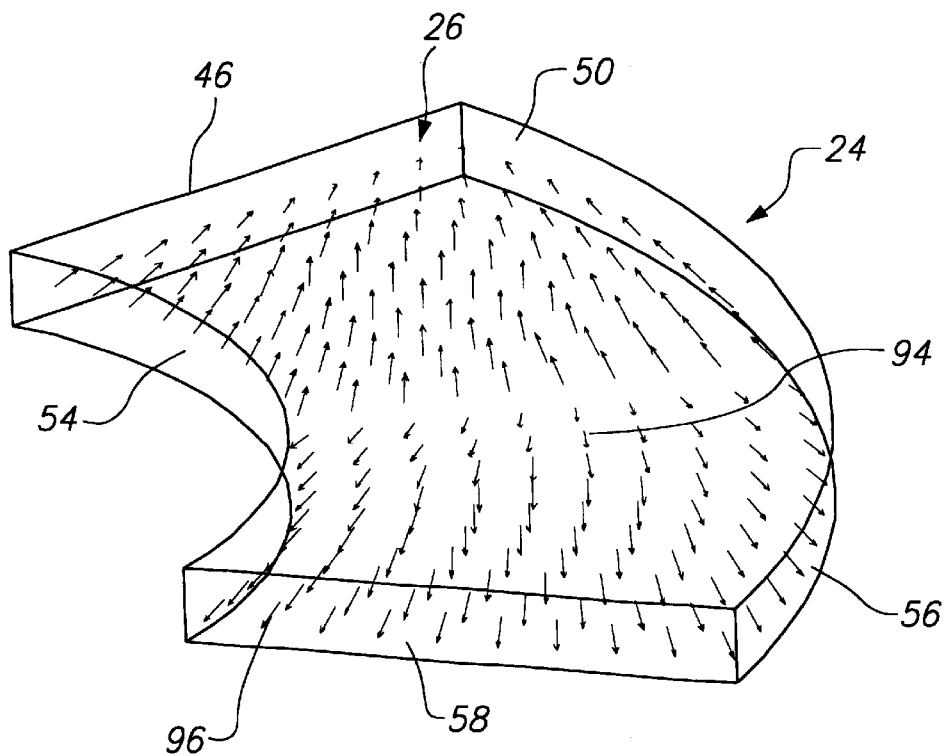
FIG. 13 is a side perspective view of the magnet of FIG. 12.
Figure 14:
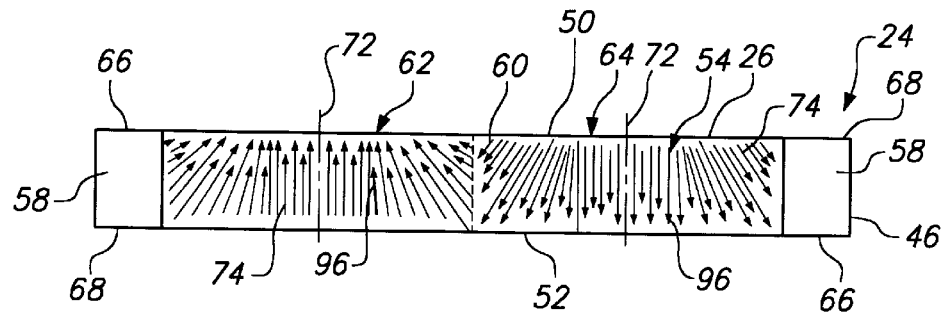
FIG. 14 is a front plan view of a bottom magnet illustrating a portion of the magnetization pattern on the inner side.
Figure 15:
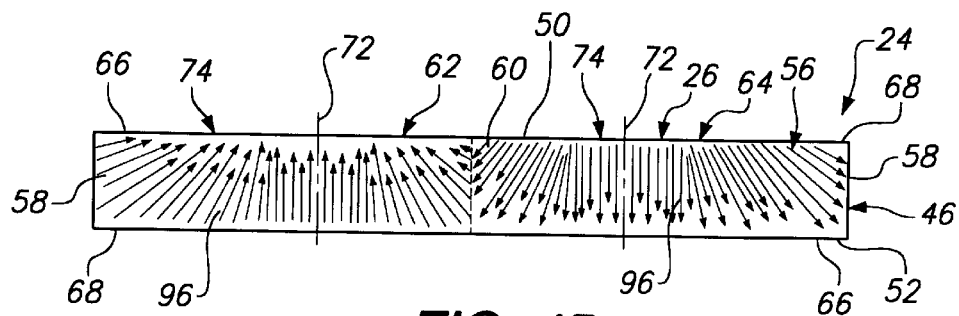
FIG. 15 is a rear plan view of the magnet of FIG. 14 illustrating a portion of the magnetization pattern on the outer side.
Figure 16:
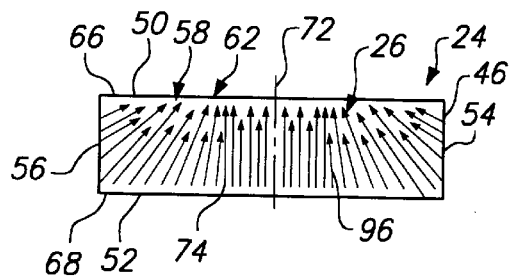
FIG. 16 is a side plan view of the magnet of FIG. 14 illustrating a portion of the magnetization pattern on a radial side.
Figure 17:
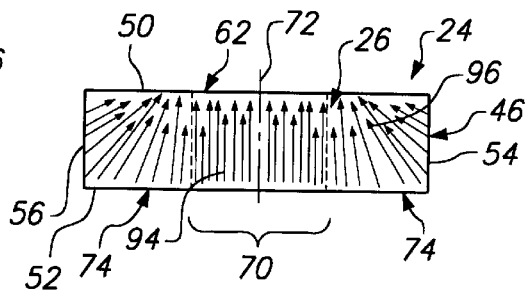
FIG. 17 is a view of the magnetization pattern of a bottom magnet as seen from Line 8—8 FIG. 3.
Figure 18:
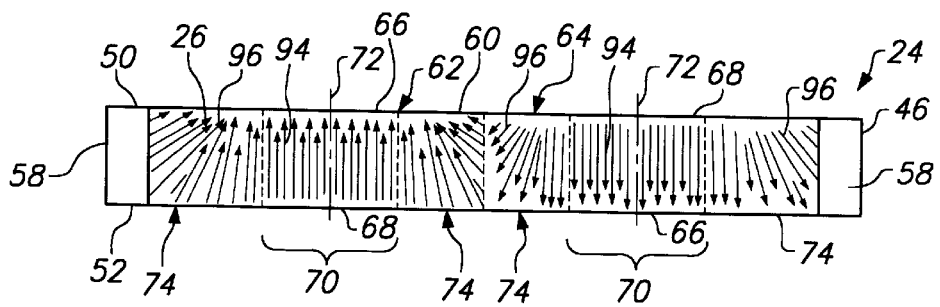
FIG. 18 is a view of the magnetization pattern of a bottom magnet as seen from Line 9—9 of FIG. 3.

To increase the efficiency of the actuator motor 20, the magnet body 46 is preferably magnetized to have the magnetization pattern 26 illustrated in FIGS. 10–18. As way of background, FIG. 10A illustrates a portion of an actuator motor 20 and the magnetization pattern 26 in a couple of magnets. 24 used in the actuator motor 20, FIG. 10B illustrates another embodiment of an actuator motor 20 and the magnetization pattern 26 in a single magnet 24 used in the actuator motor 20, FIG. 11 is a top perspective view of a pair of magnets 24 illustrating the magnetization pattern 26, FIG. 12 is a top perspective view of a single magnet 24, FIG. 13 is a side perspective view of the magnet 24, FIG. 14 illustrates the magnetization pattern 26 when looking towards the inner side 54 of the magnet body 24, FIG. 15 illustrates the magnetization pattern 26 when looking towards the outer side 56, FIG. 16 illustrates the magnetization pattern 26 when looking a radial side 58, FIG. 17 illustrates the magnetization pattern 26 as seen from Line 8—8 of FIG. 3 and FIG. 18 illustrates the magnetization pattern 26 as seen from Line 9—9 of FIG. 3.

Specifically, each segment 62, 64 of the magnet 24 includes a magnetization pattern 26 having (i) first region magnetization lines 94 (illustrated in FIGS. 17 and 18) in the first region 70 which are substantially parallel with the first region axis 72 and (ii) second region magnetization lines 96 in the second region 74 which are angled relative to the first region axis 72.

Referring to FIGS. 17 and 18, the first region magnetization lines 94 near the second region 74 are still generally parallel to the first region axis 72. It should be recognized, however, that the first region magnetization lines 94 tend to angle slightly relative to the first region axis 72 as the radial distance from the first region axis 72 increases. Similarly, a second region magnetization line 96 orientation gradient exists in the second region 74 as the radial distance away from the first region axis 74 increases. More specifically, for each second region 74, the second region magnetization lines 92 near the first region 70 are almost parallel with the first region axis 72 while the second region magnetization lines 92 away from the first region 70 are more angled. Stated another way, the second region magnetization lines 92 for each second region 74 transfer from being almost vertical near the first region 70 to severely angled away from the first region 70. The angle of the second region magnetization lines 92 increases as the distance from the first region axis 72 increases. In particular, the second region magnetization lines 92 near the sides 54, 56, 58 can be between approximately 20 and 70 degrees relative to the first region axis 72.

Preferably, the second region magnetization lines 92 throughout the entire second region 74 are angled relative to the first region axis 72. More specifically, the second region magnetization lines 92 for each second region 74 are angled relative to the first region axis 72 near the inner side 54, the outer side 56, each radial side 58 and the transition zone 60.

As discussed above, the magnet powder 48 is aligned into the powder pattern to enhance ability of the magnet body 46 to retain the magnetization pattern 26. A comparison of FIGS. 5–9 illustrates that the alignment of magnet powder 48 in the powder pattern 75 is somewhat similar to the alignment of the magnetization pattern 26 illustrated in FIGS. 14–18. As provided herein, the alignment of the magnet powder 48 in the magnet body 46 is designed to correspond to alignment of the magnetization lines 94, 96 in the magnetization pattern 26.

Figure 20:
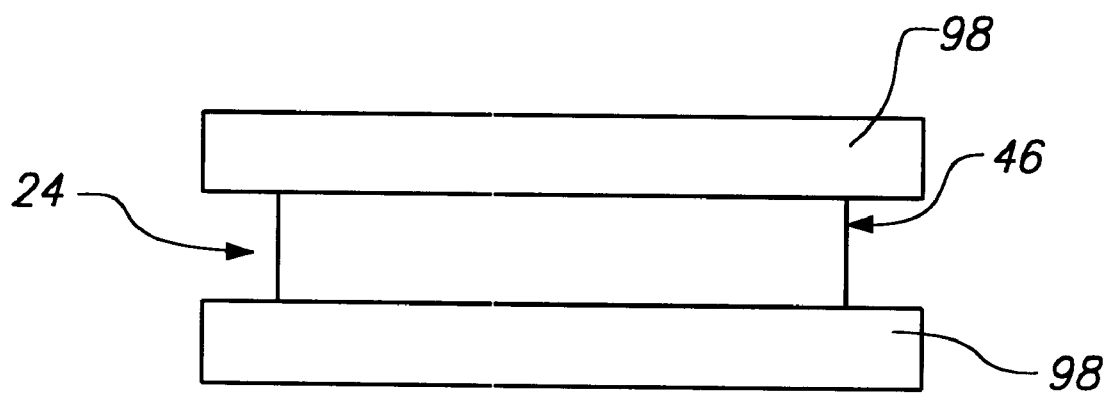
FIG. 20 is a side plan illustration of a magnetization fixture and magnet body having features of the present invention.

Referring to FIG. 20, the magnet body 46 can be subjected to the magnetization pattern 26 utilizing an impulse magnetizing process with a magnetizing fixture 98. The manufacturing of the appropriate magnetizing fixture 98 for magnetization of magnet body 46 may be accomplished using a number of techniques well known to designers of magnetizing fixtures 98, including upper and lower magnetizing conductors (not shown), and shaped steel magnetizing yokes (not shown).

The magnet body 46 is preferably made of anisotropic NdBFe which is a strong permanent magnet. However, those skilled in the art will recognize that other materials can be utilized.

The distinguishing characteristic of the magnet 10 built in accordance with the present invention is the magnet powder 46 is aligned during manufacturing to have a powder pattern 75 which corresponds to the magnetization lines in the magnetization pattern 26.

Importantly, each magnet 24 is made utilizing a unique manufacturing process and the magnet 24 includes a unique magnetization pattern 26. The magnetization pattern 26 results in higher magnetic flux densities at the sides 54, 56, 58 of the magnet 24, higher average magnetic flux densities and more linear magnetic flux densities in the magnet 24. The higher magnetic flux densities create higher seek forces for quicker data seek times. The linear flux densities result in accurate movements of the actuator motor 20.

Additionally, the higher magnetic flux densities at the sides 54, 56, 58 of the magnet body 46 , i.e. a greater radius, results in higher torques on a coil 22 of the actuator motor 20. This enables the magnet 24 to generate more force from a given amount of current in the coil 22 and increases the efficiency of the actuator motor 20. This also reduces the amount of power consumed by the actuator motor 20, reduces the amount of heat and noise generated by the actuator motor 20 during operation and increases operational time of the actuator motor 20 for a given battery charge. Further, the size of the magnet 24 can be reduced for a given force requirement. These considerations are particularly important for computer disk drives 10, which often operate in heat and noise sensitive environments, or on battery power.

While the particular magnets 24 and actuator motor 20 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A permanent magnet adapted for use with an actuator motor of a disk drive, the permanent magnet comprising a magnet body which is made of a magnet powder, the magnet body having a first segment which includes a first region and a second region, the first region having a first region axis which extends between a north pole and a south pole of the first region; wherein a portion of the magnet powder in the magnet body is aligned during manufacturing to form a powder pattern having second region powder lines in at least a portion of the second region which are angled relative to the first region axis.

2. The magnet of claim 1 wherein the powder pattern includes first region powder lines in at least a portion of the first region which are substantially parallel with the first region axis.

3. The magnet of claim 1 wherein the second region powder lines are angled away from the first region axis from the north pole to the south pole.

4. The magnet of claim 1 wherein the second region powder lines are angled towards the first region axis from the north pole to the south pole.

5. The magnet of claim 1 wherein the angle of the second region powder lines increases as the distance from the first region axis increases.

6. The magnet of claim 1 wherein the second region powder lines throughout the entire second region are angled relative to the first region axis.

7. The magnet of claim 1 wherein the second region encircles the first region and the magnet body is arched shaped.

8. The magnet of claim 1 including a magnetization pattern having second region magnetization lines in the second region which are angled relative to the first region axis.

9. The magnet of claim 8 wherein the magnetization pattern includes first region magnetization lines in the first region which are substantially parallel with the first region axis.

10. An actuator motor including the magnet of claim 1.

11. A disk drive including the actuator motor of claim 10.

12. A permanent magnet comprising a curved shaped magnet body which is made of a magnet powder, the magnet body including a first segment and a second segment which are substantially side by side, each segment having a north pole and a spaced apart south pole, each segment including a first region having a first region axis which extends between the north pole and the south pole and a second region which encircles the first region, wherein the magnet powder is aligned during manufacturing to form a powder pattern having (i) first region powder lines in the first region which are substantially parallel with the first region axis and (ii) second region powder lines in the second region which are angled relative to the first region axis; wherein each segment includes a magnetization pattern having (i) first region magnetization lines in the first region which are substantially parallel with the first region axis and (ii) second region magnetization lines in the second region which are angled relative to the first region axis.

13. The magnet of claim 12 wherein the angle of the second region powder lines increases as the distance from the first region axis increases.

14. The magnet of claim 12 wherein the second region powder lines throughout the entire second region are angled relative to the first region axis.

15. An actuator motor including the magnet of claim 12.

16. A disk drive including the actuator motor of claim 15.

17. A method for manufacturing a magnet, the method comprising the steps of:

providing a magnet powder;

providing a mold having a mold cavity;

positioning the magnet powder in the mold cavity to form a magnet body having a first segment which includes a first region and a second region, the first region having a first region axis; and aligning a portion of the magnet powder in the mold cavity to form a powder pattern having first region powder lines in the first region which are substantially parallel with the first region axis and second region powder lines in the second region which are angled relative to the first region axis.

18. The method of claim 17 wherein the step of aligning the magnet powder includes the step of creating a magnetic field which extends into the mold cavity.

19. The method of claim 17 including the step of creating a magnetization pattern in the magnet body, the magnetization pattern having (i) first region magnetization lines in the first region which are substantially parallel with the first region axis and (ii) second region magnetization lines in the second region which are angled relative to the first region axis.

* * * * *